United States Patent
Nien et al.

(10) Patent No.: US 8,888,374 B1
(45) Date of Patent: Nov. 18, 2014

(54) BEARING WITH ANTISKID DESIGN

(71) Applicant: Hiwin Technologies Corp., Taichung (TW)

(72) Inventors: Fang-Ling Nien, Taichung (TW); Chia-Yin Tsai, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 13/889,566

(22) Filed: May 8, 2013

(51) Int. Cl.
F16C 33/58 (2006.01)
F16C 43/00 (2006.01)
F16C 19/06 (2006.01)
F16H 49/00 (2006.01)

(52) U.S. Cl.
CPC ............... F16C 33/585 (2013.01); F16C 19/06 (2013.01); *F16H 2049/003* (2013.01)
USPC ........... 384/513; 384/537; 384/564; 384/569; 384/585; 74/640; 74/457

(58) Field of Classification Search
CPC ............................................... F16H 2049/003
USPC .......... 384/477, 490, 513, 535–537, 548.564, 384/569, 585, 607, 621; 29/412, 457, 640
See application file for complete search history.

(56) References Cited

U.S. PATENT DOCUMENTS

| | | | | | |
|---|---|---|---|---|---|
| 2,779,641 | A | * | 1/1957 | Sutowski | 384/502 |
| 3,196,713 | A | * | 7/1965 | Robinson | 74/640 |
| 3,424,432 | A | * | 1/1969 | Humphreys | 74/640 |
| 3,451,736 | A | * | 6/1969 | Riccio | 384/537 |
| 4,125,298 | A | * | 11/1978 | Heurich et al. | 384/537 |
| 4,577,127 | A | * | 3/1986 | Ferree et al. | 310/83 |
| 4,611,933 | A | * | 9/1986 | Hofmann et al. | 384/512 |
| 5,066,147 | A | * | 11/1991 | Brandenstein et al. | 384/585 |
| 6,328,006 | B1 | * | 12/2001 | Heer | 123/90.15 |
| 7,803,079 | B2 | * | 9/2010 | Sakamoto et al. | 384/417 |
| 7,891,272 | B2 | * | 2/2011 | Schonlau | 74/640 |
| 2008/0110287 | A1 | * | 5/2008 | Schonlau | 74/457 |
| 2013/0081587 | A1 | * | 4/2013 | David et al. | 123/90.17 |
| 2013/0333505 | A1 | * | 12/2013 | Yeh | 74/412 R |
| 2013/0333516 | A1 | * | 12/2013 | Yeh | 74/640 |

FOREIGN PATENT DOCUMENTS

| | | | | | |
|---|---|---|---|---|---|
| DE | 102007055838 | * | 6/2009 | | F16H 49/00 |
| GB | 2064685 | A * | 6/1981 | | F16H 13/08 |
| JP | 07332442 | A * | 12/1995 | | F16H 1/32 |
| JP | 2000179631 | A * | 6/2000 | | F16H 1/32 |

* cited by examiner

Primary Examiner — Marcus Charles
(74) Attorney, Agent, or Firm — Banger Shia (57) ABSTRACT

A bearing with antiskid design used in combination with a circular spline to form a harmonic drive, and the circular spline is provided with an inner toothed portion, the bearing includes: an elliptical gear plug, a flexible ball bearing, and a flexible spline. Between the flexible ball bearing and the flexible spline are disposed a first and second antiskid members, and the arrangement of the first and second antiskid members prevents the axial slippage between the flexible ball bearing and the flexible spline, thus improving stability and transmission accuracy of the harmonic drive.

6 Claims, 12 Drawing Sheets

BEARING WITH ANTISKID DESIGN

BACKGROUND OF THE INVENTION

1. Field of the Invention

The present invention relates to a gear reduction mechanism, and more particularly to a ball bearing with antiskid design.

2. Description of the Prior Art

Harmonic drive is also called strain wave gearing which is a typical gear reduction mechanism and essentially comprises a wave generator, a flex spline and a circular spline. The wave generator includes an elliptical gear plug and a flexible ball bearing. The flex spline fits over the wave generator and then is disposed inside the circular spline. The elliptical gear plug is connected to a drive force input end. When rotated by the driving force, the elliptical gear plug will push the flex spline and make it partially meshed with the teeth of the circular spline. Therefore, gear reduction can be achieved by the difference of the numbers of the teeth of the flex and circular splines.

Figure 1:
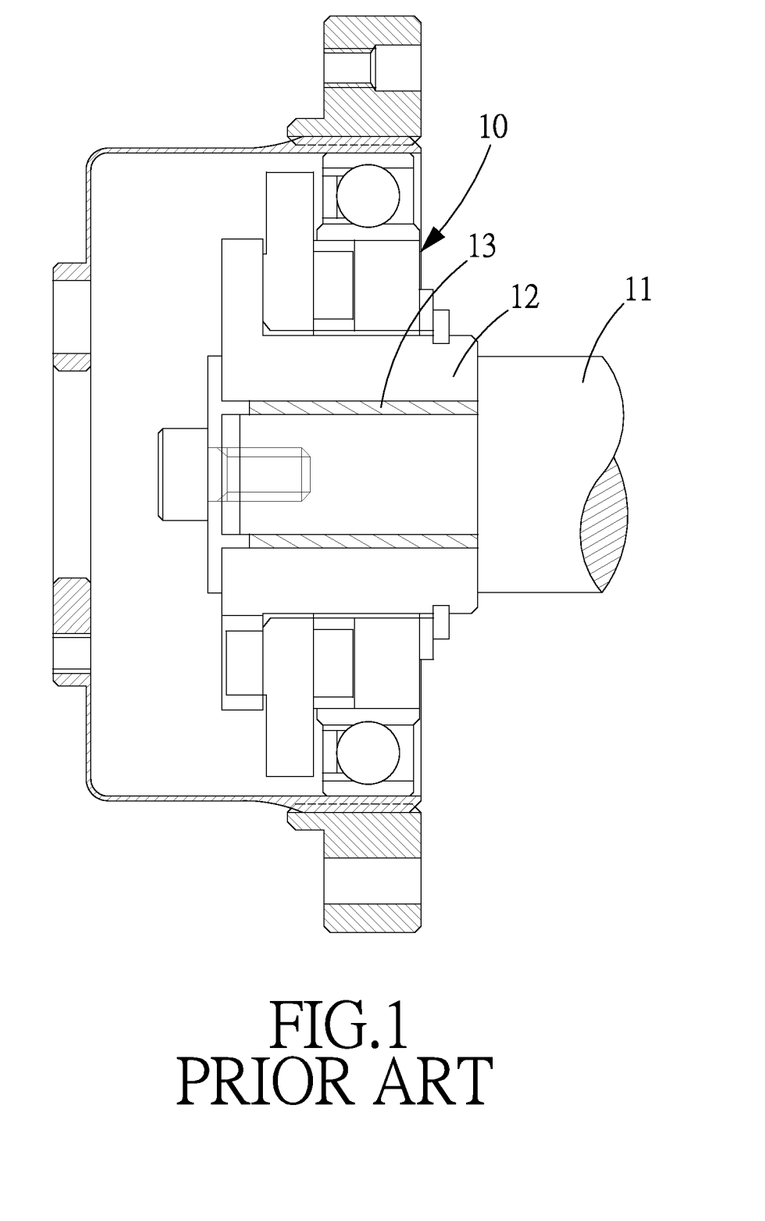
FIG. 1 is a cross sectional view of a conventional harmonic drive.

When the harmonic drive is working, its transmission accuracy is greatly influenced by the engagement conditions of the respective components. In order to ensure the end transmission accuracy, the harmonic transmission mechanism 10, as shown in FIG. 1, is provided with a friction ring 13 between a driving shaft 11 and a gear plug 12 to reduce ratchet effect and slippage therebetween and improve transmission accuracy.

Figure 2A:
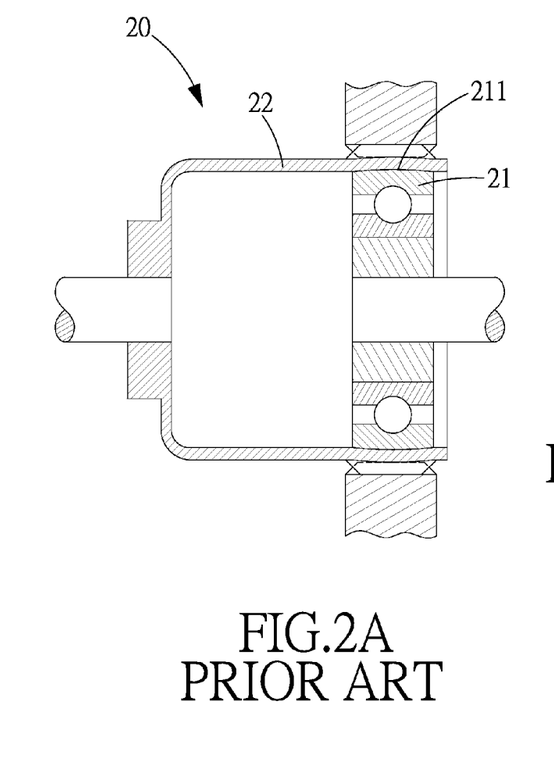
FIG. 2A is a cross sectional view of another conventional harmonic drive.
Figure 2B:
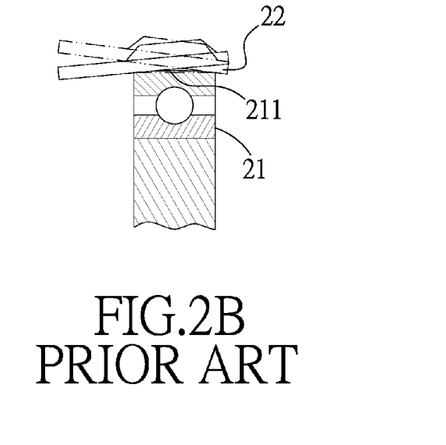
FIG. 2B is operational view of a part of FIG. 2A.

Another harmonic drive 20 as shown in FIG. 2 is provided with an arc-shaped protrusion 211 around the outer surface of the flexible ball bearing 21 of the wave generator to increase the contact area of the flex spline 22, thus increasing friction and reducing slippage of the flexible ball bearing 21. However, the surface of the flex spline 22 for contacting the outer surface of the flexible ball bearing 21 is flat, therefore, the anti-slippage effect will be limited, and it is unable to completely prevent skid of the flexible ball bearing in the axial direction X.

The present invention has arisen to mitigate and/or obviate the afore-described disadvantages.

SUMMARY OF THE INVENTION

The primary objective of the present invention is to provide a bearing with antiskid design, which is capable of preventing axial slippage and improving transmission accuracy.

To achieve the above objective, a bearing with antiskid design used in combination with a circular spline to form a harmonic drive, and the circular spline being provided with an inner toothed portion, the bearing comprises: an elliptical gear plug, a flexible ball bearing, and a flexible spline.

The elliptical gear plug is coupled to and rotated by a driving shaft.

The flexible ball bearing fits over the elliptical gear plug and includes an outer ring and a plurality of balls between the elliptical gear plug and the outer ring, and the outer ring is provided with a first antiskid member.

The flexible spline includes an annular body with an inner peripheral surface and an outer peripheral surface, the outer peripheral surface is provided with an outer toothed portion for meshing with the inner toothed portion of the circular spline, and the outer toothed portion of the flexible spline has less teeth than the inner toothed portion of the circular spline. A second antiskid member is disposed on the inner peripheral surface of the flexible spline and formed to fit a shape of the first antiskid member, the flexible spline is sleeved onto the outer ring of the flexible ball bearing, and the second antiskid member is engaged in the first antiskid member.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 3-10, a bearing with antiskid design in accordance with a preferred embodiment of the present invention is used in combination with a circular (rigid) spline 30 to form a harmonic drive, and the circular spline 30 is provided with an inner toothed portion 31. The bearing comprises: an elliptical gear plug 40, a flexible ball bearing 50, a first antiskid member 60, a flexible spline 70, and a second antiskid member 80.

Figure 3:
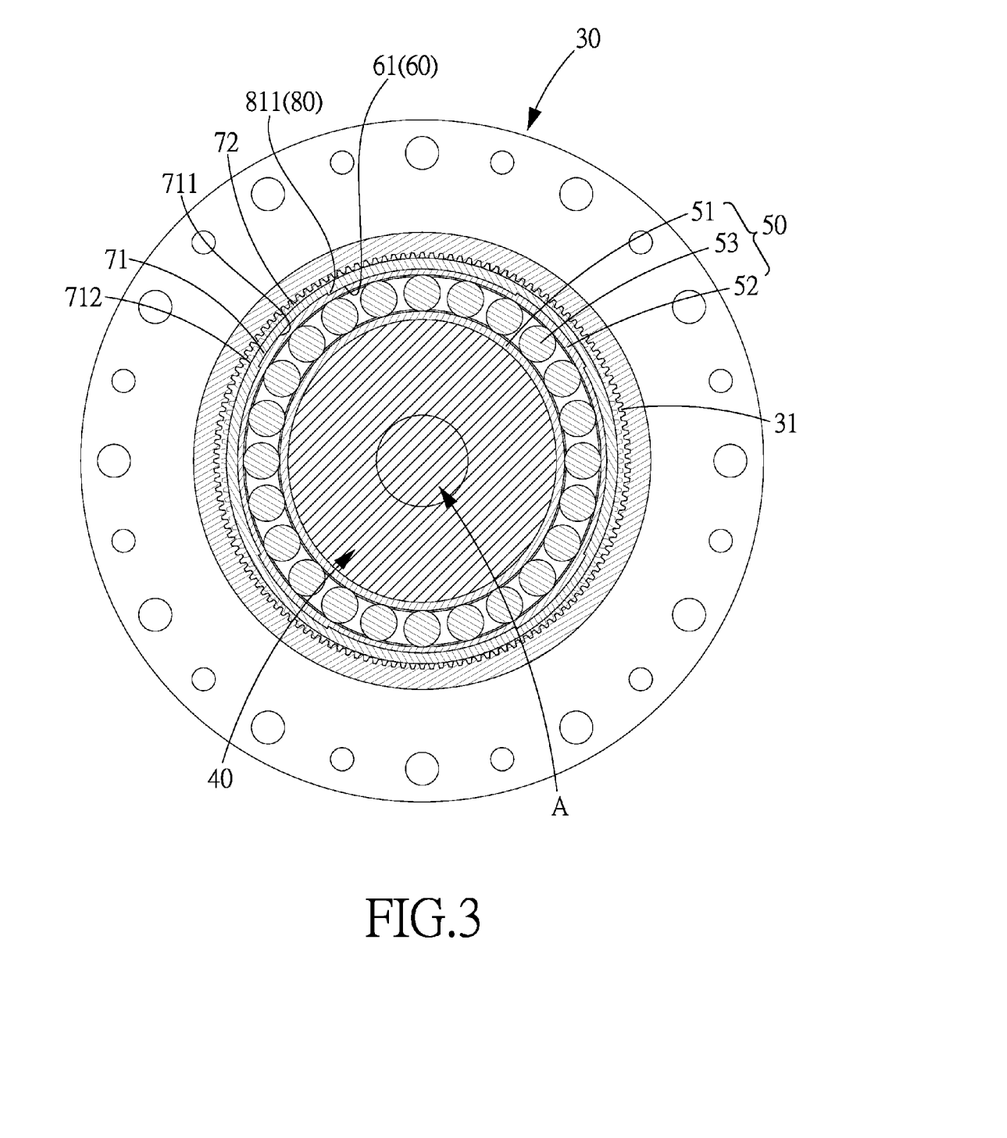
FIG. 3 is a cross sectional view showing that a bearing with antiskid design in accordance with a preferred embodiment of the present invention is used in combination with a circular (rigid) spline to form a harmonic drive.
Figure 4:
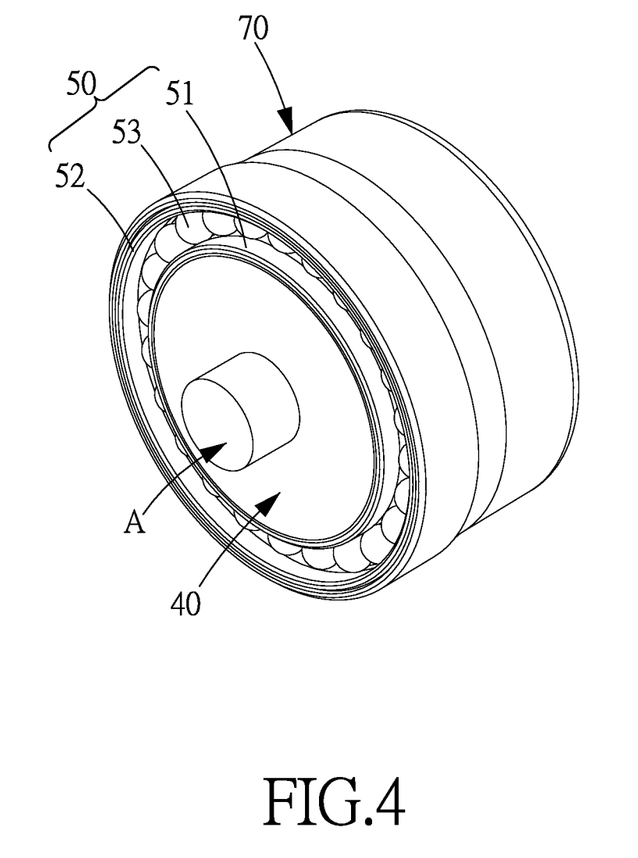
FIG. 4 is an assembly view of the bearing with antiskid design in accordance with the present invention.

The elliptical gear plug 40 is coupled to and rotated by a driving shaft A which extends in an axial direction X, and a direction perpendicular to the axial direction X is defined as a radial direction Y.

Figure 5:
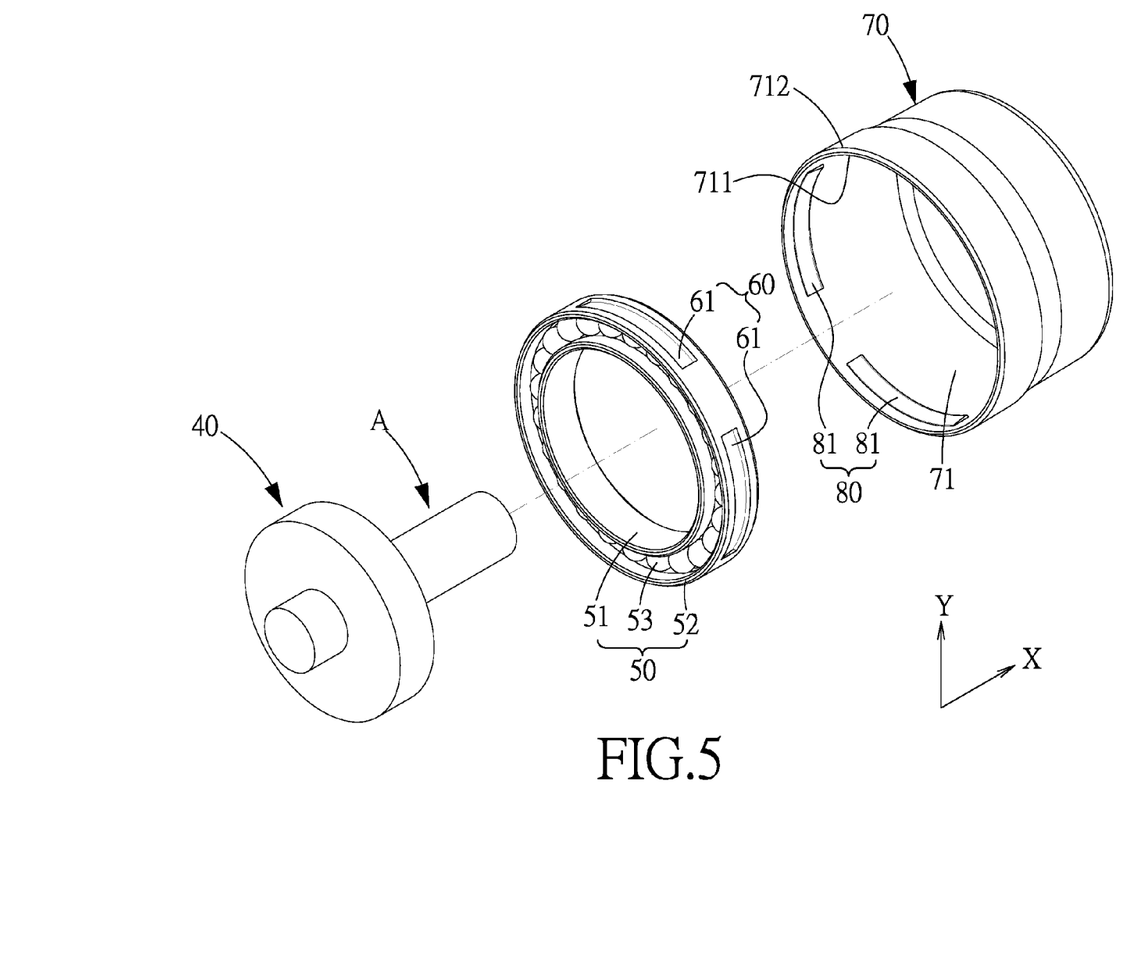
FIG. 5 is an exploded view of the bearing with antiskid design in accordance with the present invention, wherein the first antiskid member takes the form of a plurality of concave structures.
Figure 6:
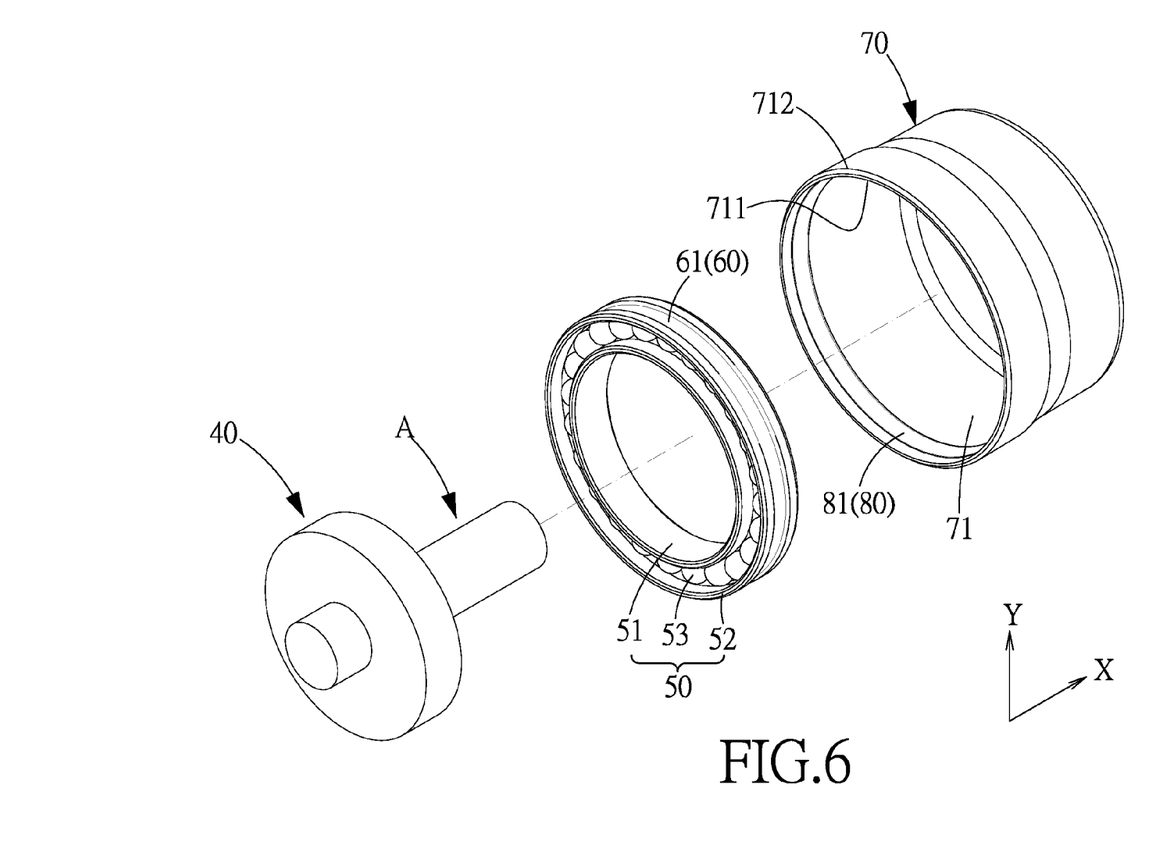
FIG. 6 is an exploded view of the bearing with antiskid design in accordance with the present invention, wherein the first antiskid member takes the form of a single annular concave structure.

The flexible ball bearing 50 fits over the elliptical gear plug 40 and includes an inner ring 51, an outer ring 52 coaxial with the inner ring 51, and a plurality of balls 53 between the inner and outer rings 51, 52. The elliptical gear plug 40 makes the flexible ball bearing 50 deform to the shape of the elliptical gear plug 40. The inner ring 51 is sleeved onto the elliptical gear plug 40. The first antiskid member 60 is disposed on the outer ring 52 and takes the form of a concave structure 61 or a convex structure 62, and there can be a single concave or convex structure 61, 62 or a plurality of concave or convex structures 61, 62. For example, as shown in FIGS. 3 and 5, the first antiskid structure 60 is provided with a plurality of spaced concave structures 61 formed around the outer ring 52, or as shown in FIG. 6, the first antiskid member 60 is provided with only a single annular concave structure 61 along the outer ring 52.

Figure 7:
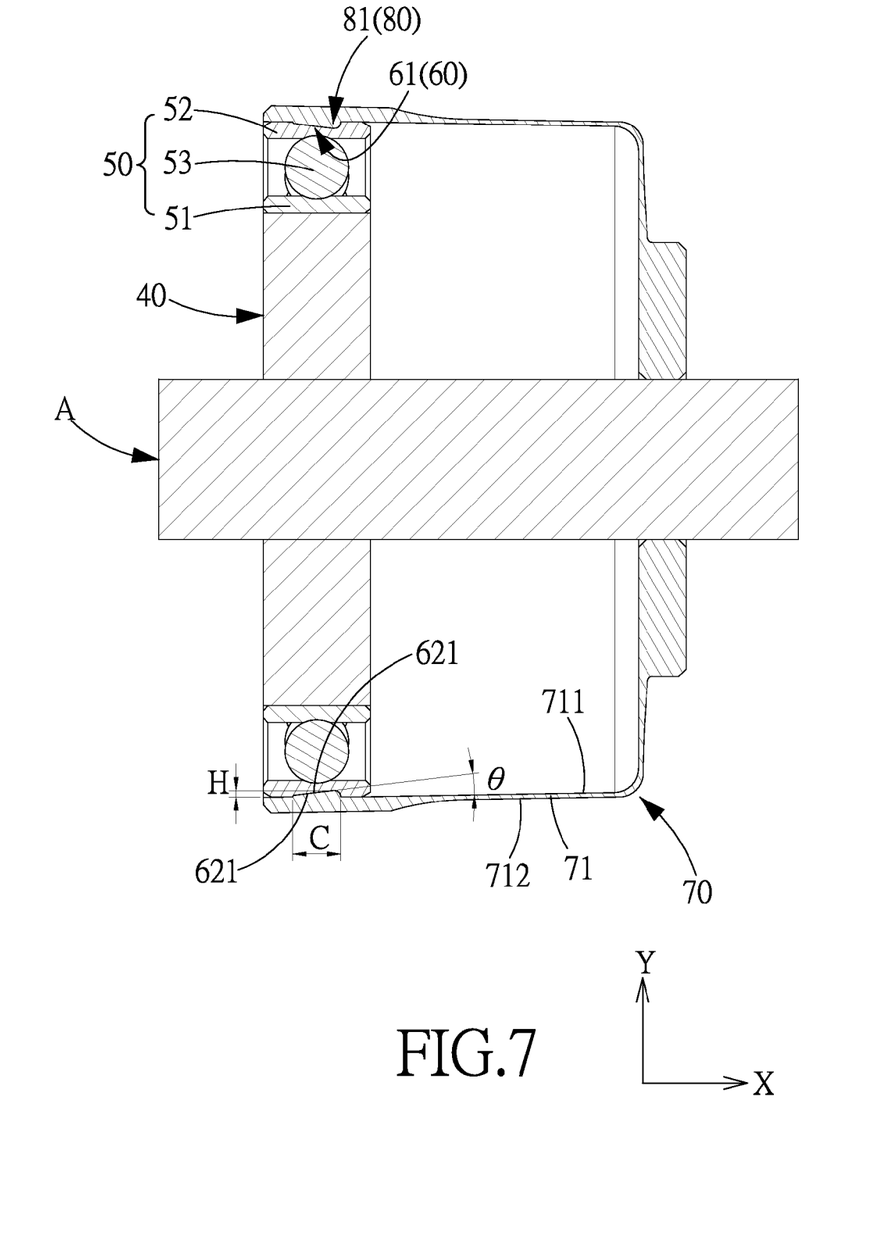
FIG. 7 is a cross sectional view of the bearing with antiskid design in accordance with the present invention, wherein the first antiskid member is a leftward inclined concave structure.
Figure 8:
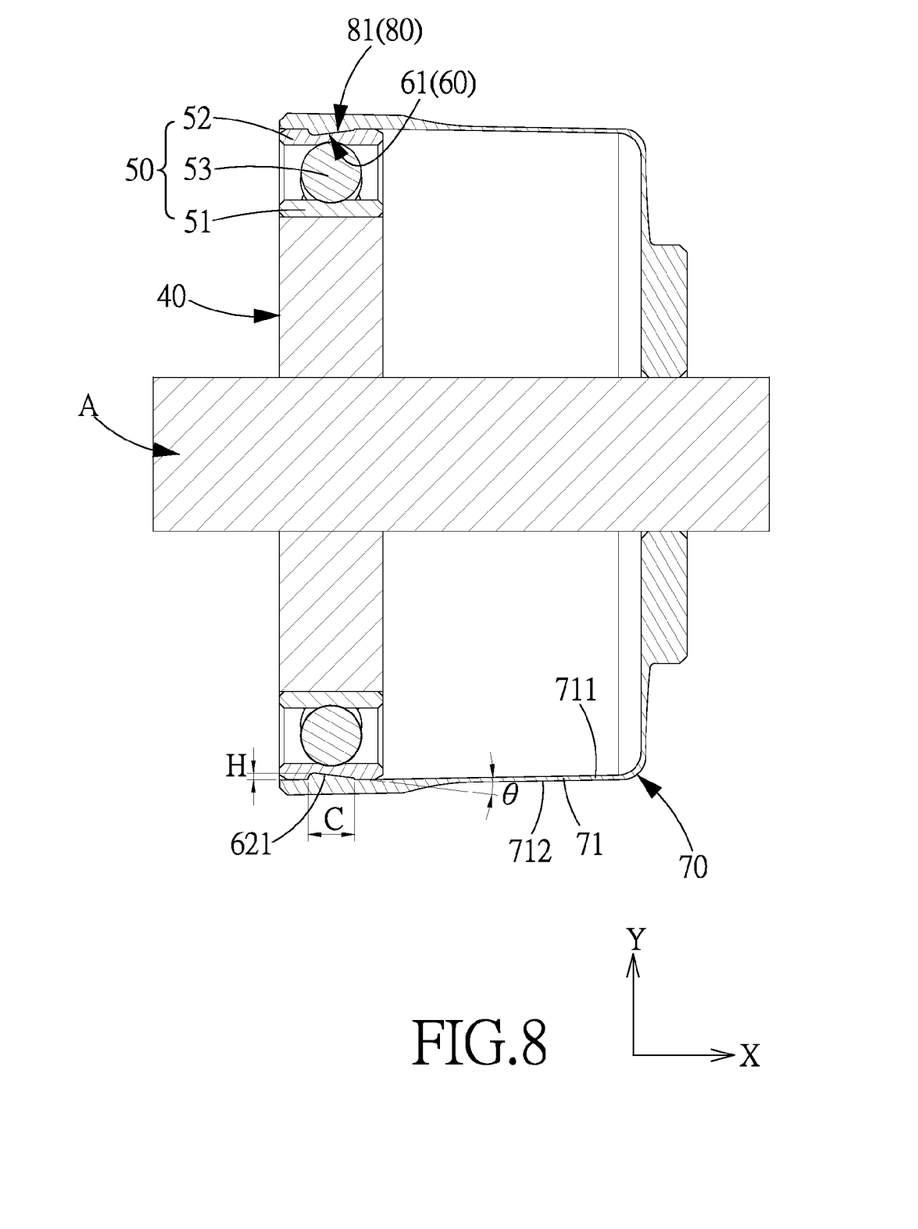
FIG. 8 is a cross sectional view of the bearing with antiskid design in accordance with the present invention, wherein the first antiskid member is a rightward inclined concave structure.

The concave structure 61 of the first antiskid member 60 can also be an inclined concave inclined towards different directions, as shown in FIGS. 7 and 8. The concave structure 61 includes an axial length (width) C extending in the axial direction X, a radial length (depth) H extending in the radial direction Y, and an inclined surface 621 which is inclined at an angle θ with respect to the outer surface of the outer ring 52, and they satisfy the relation: tan θ=H/C.

Figure 9:
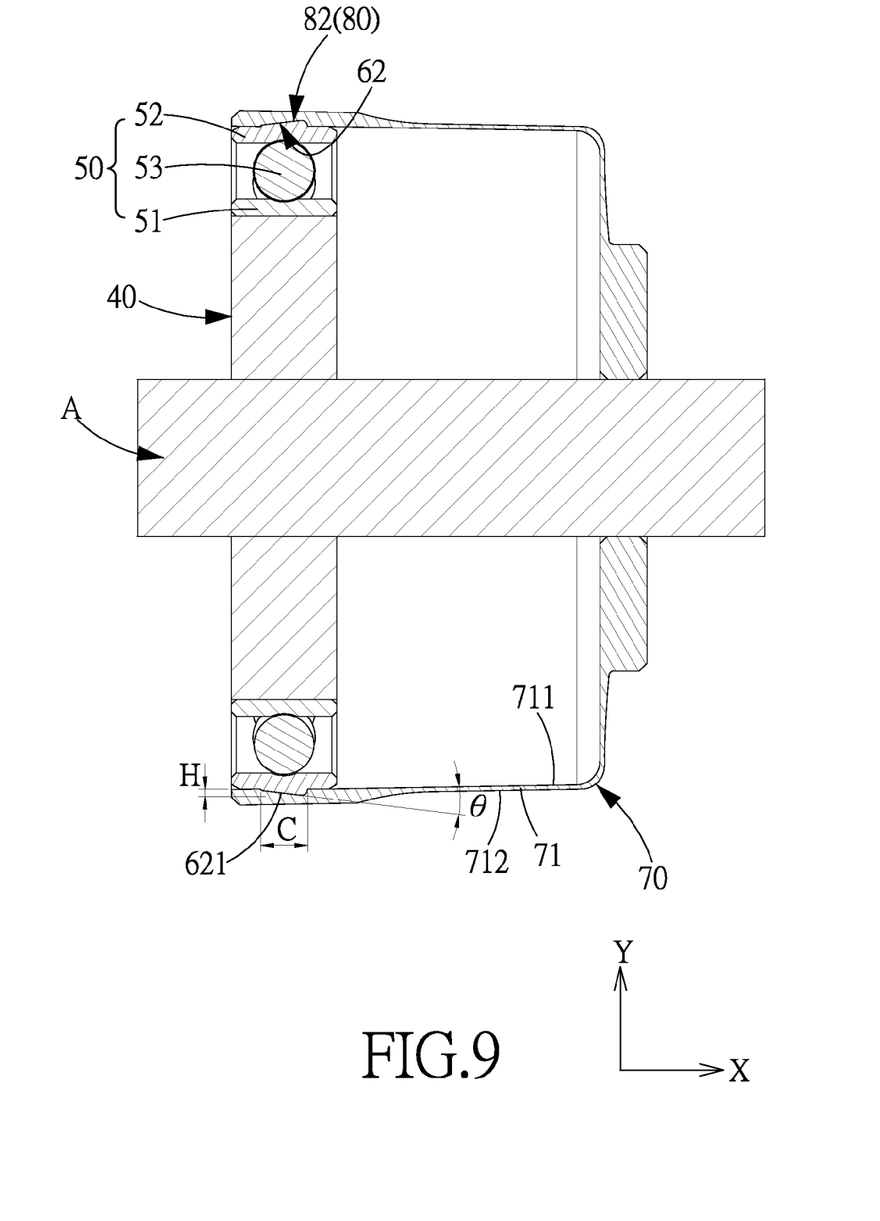
FIG. 9 is a cross sectional view of the bearing with antiskid design in accordance with the present invention, wherein the first antiskid member is a leftward inclined convex structure.
Figure 10:
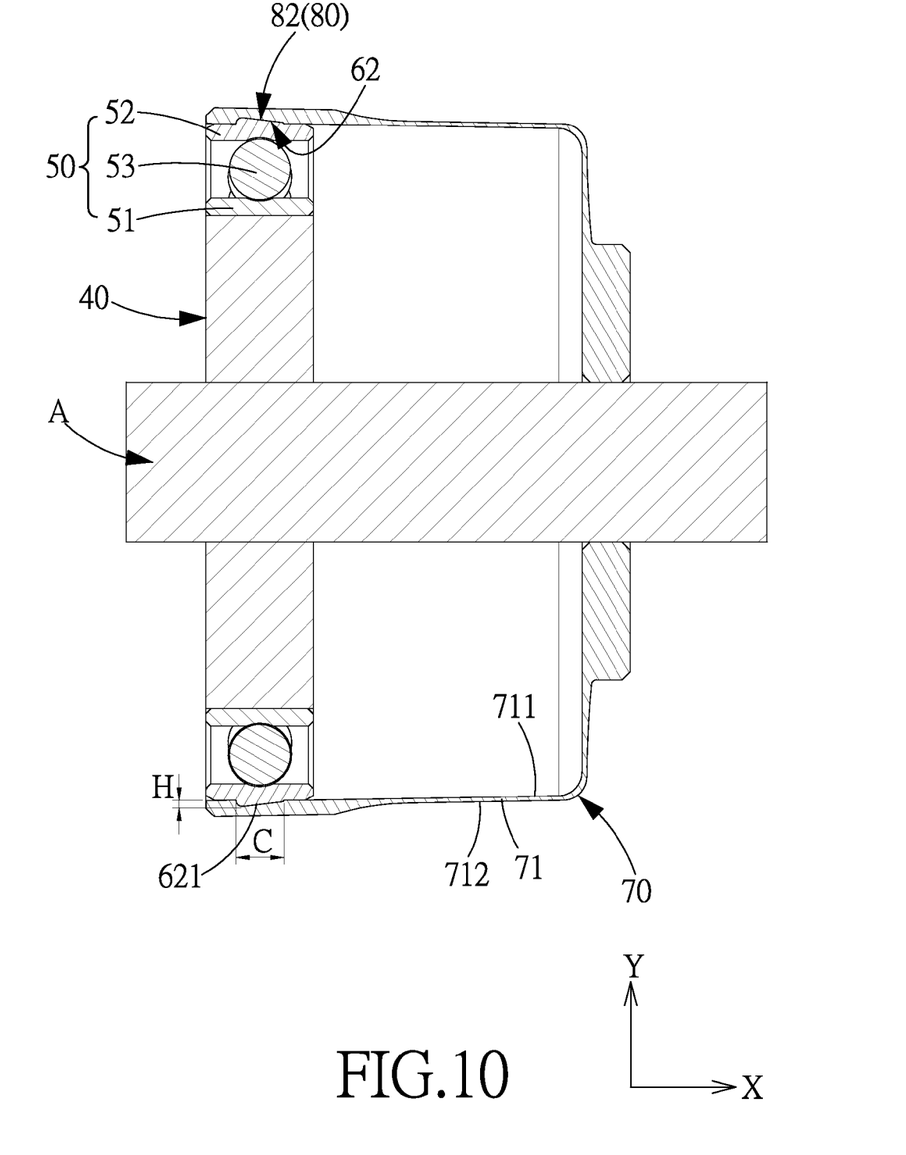
FIG. 10 is a cross sectional view of the bearing with antiskid design in accordance with the present invention, wherein the first antiskid member is a rightward inclined convex structure.

The convex structure 62 of the first antiskid member 60 can also be an inclined convex inclined towards different directions, as shown in FIGS. 9 and 10. The convex structure 62 includes an axial length (width) C extending in the axial direction X, a radial length (height) H extending in the radial direction Y, and an inclined surface 621 which is inclined at an angle θ with respect to the outer surface of the outer ring 52, and they satisfy the relation: tan θ=H/C.

The flexible spline 70 includes an annular body 71 with an inner peripheral surface 711 and an outer peripheral surface 712. The outer peripheral surface 712 is provided with an outer toothed portion 72 (as shown in FIG. 3) for meshing with the inner toothed portion 31 of the circular spline 30, and the outer toothed portion 72 of the flexible spline 70 has two teeth less than the inner toothed portion 31 of the circular spline 30. The flexible spline 70 has a uniform thickness, and the second antiskid member 80 is disposed on the inner peripheral surface 711 of the flexible spline 70 to engage in a concave and convex relationship with the first antiskid member 60. The second antiskid member 80 is formed to fit the shape of the first antiskid member 60. The flexible spline 70 is sleeved onto the outer ring 52 of the flexible ball bearing 50, and the second antiskid member 80 is engaged in the first antiskid member 60. As shown in FIG. 5, the second antiskid member 80 takes the form of a convex structure 81 for engaging with the concave structure 61. Or, as shown in FIGS. 9 and 10, the second antiskid member 80 can take the form of a concave structure 82 for engaging with the convex structure 62.

The flexible spline 70 and the radial length H of the concave structure 61 satisfy the relation: H=the thickness of the flexible spline×0.5 m, wherein m represents the modulus of the flexible spline 70, and flexible spline 70 and the radial length H of the convex structure 62 satisfy the relation: H=the thickness of the flexible spline×0.5 m−0.15.

When in use, the elliptical gear plug 40 is driven to rotate by the driving shaft A. Since the elliptical gear plug 40 is elliptical, and the flexible ball bearing 50 and the flexible spline 70 deform to the shape of the elliptical gear plug 40, when the elliptical gear plug 40 rotates, the flexible spline 70 will keep meshing with the circular spline 30 with different teeth, and the points where the teeth of the flexible spline 70 and the circular spline 30 mesh will revolve around the center point at the same rate as the elliptical gear plug 40. Therefore, for every full rotation of the elliptical gear plug 40, the flexible spline 70 would be required to rotate a slight amount two teeth backward relative to the circular spline 30, resulting in a gear reduction.

The arrangement of the first and second antiskid members 60, 80 prevents the axial slippage between the flexible ball bearing 50 and the flexible spline 70, which improves the stability and transmission accuracy of the harmonic drive.

Figure 11:
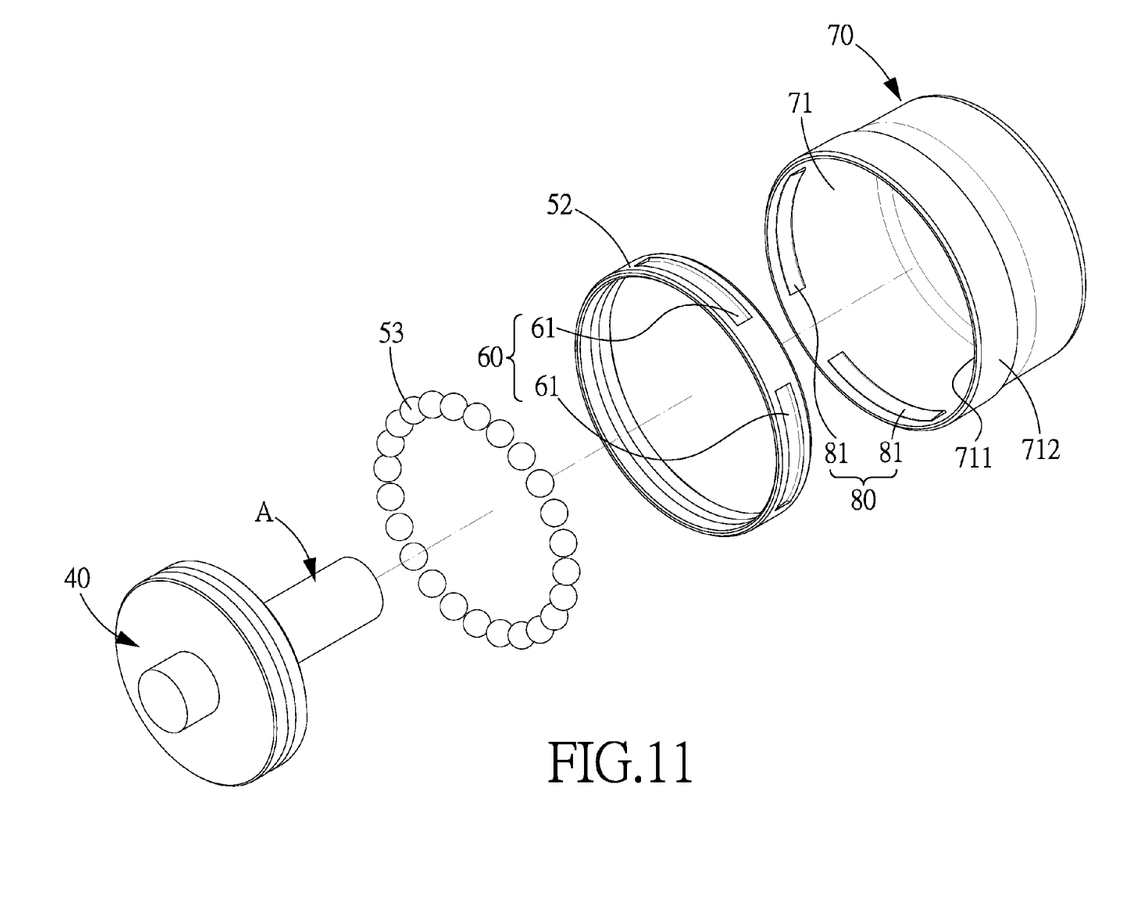
FIG. 11 is an exploded view of a bearing with antiskid design in accordance with a second preferred embodiment of the present invention.
Figure 12:
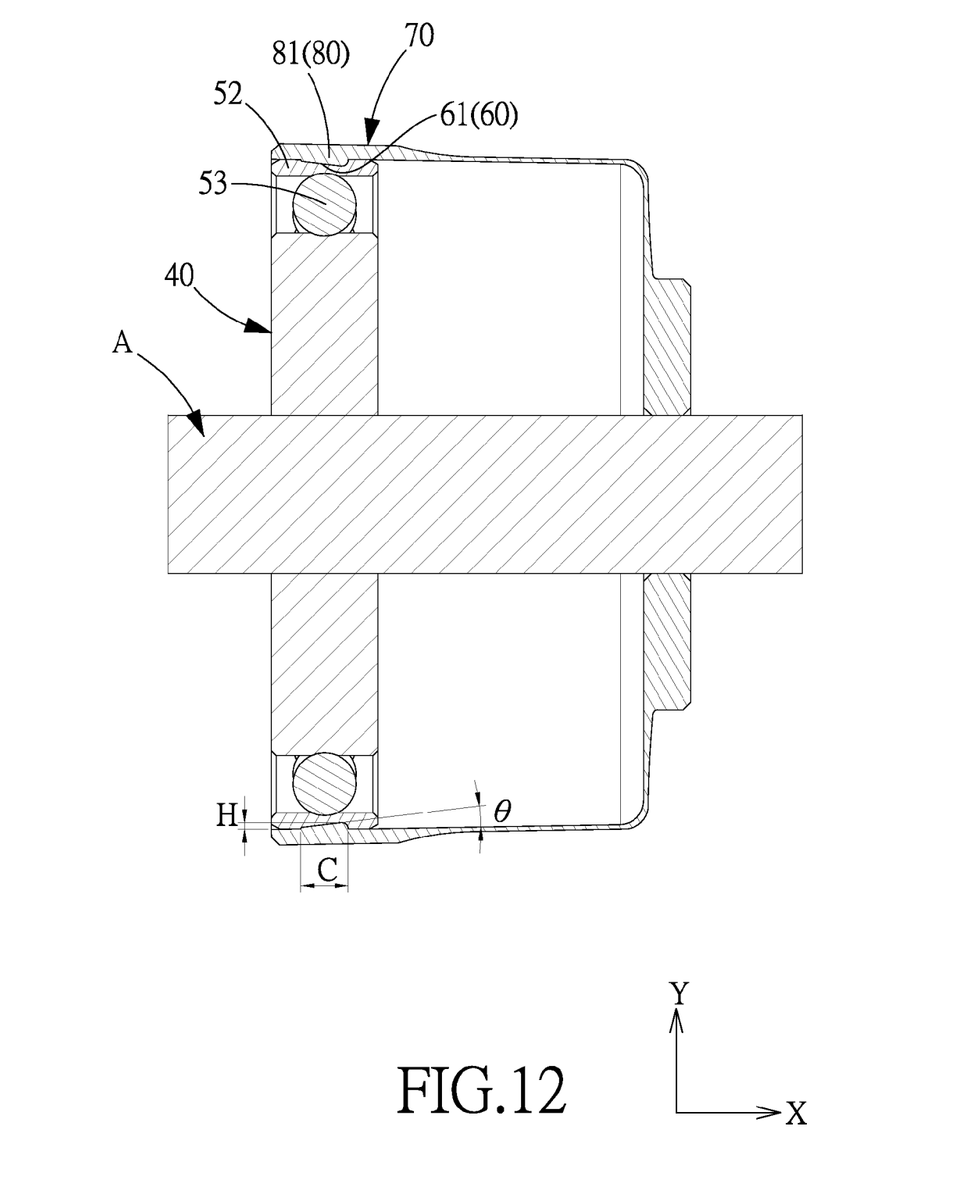
FIG. 12 is a cross sectional view of the bearing with antiskid design in accordance with the second preferred embodiment of the present invention.

FIGS. 11 and 12 show another embodiment of the flexible ball bearing 50, wherein the flexible ball bearing 50 is provided with no inner ring 51, the outer ring 52 is sleeved onto the elliptical gear plug 40, and the balls 53 are disposed between the outer ring 52 and the elliptical gear plug 40.

While we have shown and described various embodiments in accordance with the present invention, it is clear to those skilled in the art that further embodiments may be made without departing from the scope of the present invention.

What is claimed is:

1. A bearing with antiskid design used in combination with a circular spline to form a harmonic drive, and the circular spline being provided with an inner toothed portion, the bearing comprising: an elliptical gear plug coupled to and rotated by a driving shaft; a flexible ball bearing fitting over the elliptical gear plug and including an outer ring and a plurality of balls between the elliptical gear plug and the outer ring, the outer ring being provided with a first antiskid member; and a flexible spline including an annular body with an inner peripheral surface and an outer peripheral surface, the outer peripheral surface being provided with an outer toothed portion for meshing with the inner toothed portion of the circular spline, and the outer toothed portion of the flexible spline having less teeth than the inner toothed portion of the circular spline; the bearing being characterized in that:
   a second antiskid member is disposed on the inner peripheral surface of the flexible spline and formed to fit a shape of the first antiskid member, the flexible spline is sleeved onto the outer ring of the flexible ball bearing, and the second antiskid member is engaged in the first antiskid member;
   a flexible spline is sleeved onto the outer ring and has a uniform thickness, and the flexible spline and the radial length H of the concave structure satisfy the relation: H=the thickness of the flexible spline×0.5 m, wherein m represents a modulus of the flexible spline;
   and the flexible spline and the radial length H of the convex structure satisfy the relation: H=the thickness of the flexible spline×0.5 m−0.15, wherein m represents a modulus of the flexible spline.

2. The bearing with antiskid design as claimed in claim 1, wherein the flexible ball bearing has an inner ring sleeved onto the elliptical gear plug, and the outer ring is sleeved on the inner ring and the elliptical gear plug, and the balls are disposed between the inner and outer rings.

3. The bearing with antiskid design as claimed in claim 1, wherein the first antiskid member takes the form of concave structure or convex structure.

4. The bearing with antiskid design as claimed in claim 3, wherein the number of the concave structure or convex structure is more than two.

5. The bearing with antiskid design as claimed in claim 1, wherein the first antiskid member takes the form of concave structure or convex structure which is an inclined convex, the convex structure includes an axial length C extending in an axial direction of the driving shaft, a radial length H extending in a radial direction of the driving shaft, and an inclined surface which is inclined at an angle θ with respect to an outer surface of the outer ring, and they satisfy the relation: tan θ=H/C.

6. The bearing with antiskid design as claimed in claim 5, wherein the number of the concave structure or convex structure is one.

* * * * *